Sept. 13, 1949.  D. C. GREEN  2,481,482
CHECK VALVE

Filed Nov. 15, 1944  3 Sheets-Sheet 1

INVENTOR
Donald C. Green
By Harry R. Canfield
ATTORNEY

Sept. 13, 1949.  D. C. GREEN  2,481,482
CHECK VALVE

Filed Nov. 15, 1944  3 Sheets-Sheet 2

INVENTOR
Donald C. Green

By Harry R. Canfield
ATTORNEY

Patented Sept. 13, 1949

2,481,482

UNITED STATES PATENT OFFICE 2,481,482

CHECK VALVE

Donald C. Green, Russell, Ohio

Application November 15, 1944, Serial No. 563,507

5 Claims. (Cl. 251—127)

This invention relates to check-valves and to seals therefor.

Check valve constructions are in general well known comprising a valve which closes a port to prevent fluid flow through the port in one direction but opens the port to permit flow in the other direction.

In some cases the check valve construction comprises a valve element held upon a valve port or seat to close it, by back-pressure on one side of the valve element, from a conduit line, reservoir or the like; and the valve element is raised from the port to open it by opening or forward pressure acting on the other side of the valve element through the port; and the present invention relates to check-valves of this class.

The fluid or pressure controlled by such valves may be that of air or other gas, or liquid, sometimes at high pressure, and a problem is presented to provide such a valve which will open freely upon the occurrence of a small differential of pressure on its two sides, and which at the same time will not leak when closed, even under high back pressure; and the parts of which can be manufactured and assembled cheaply and without the necessity of accurately fitting the valve and port to each other to render the valve leakproof.

Check-valves of this general class have been proposed in which the seal between the valve and its port or seat has been effected by an annulus or ring of rubber; and such rings have become commercially known as "O-rings"; but because of certain deficiencies in the construction of the parts with which such a sealing ring has heretofore been associated, the ring becomes mutilated or deformed or displaced in the operation of the valve, resulting in failure to seal upon closing and in rapid deterioration of the seal. This is particularly true when the fluid pressure to be sealed is high, or when the valve opening pressure is high or abruptly applied; or when the fluid flows through the opened port at high velocity; so that such valves are not durable and otherwise are not satisfactory in many applications.

It is among the objects of the present invention:

To provide a check valve construction of the class referred to which overcomes the objections to prior constructions, some of which are mentioned above;

To provide a check valve construction having an improved construction and mode of operation;

To provide a check valve having an improved seal;

To provide a check valve which utilizes a rubber or like sealing annulus in an improved manner;

To provide a check valve construction which utilizes a rubber or like sealing annulus to seal it when closed, and having means for causing the fluid to flow around the outside of the annulus in an improved manner when the valve opens;

To provide a check valve construction having a movable valve element and a rubber or like sealing annulus thereon to seal the valve element when in closed position; and which annulus moves on the valve element when it opens; and in which means is provided to return the annulus on the valve element when the valve closes.

Other objects will be apparent to those skilled in the art to which my invention appertains.

My invention is fully described in the following description taken in connection with the accompanying drawing in which.

My invention may be embodied in various types of check valve construction, depending upon the kind of apparatus with which it is utilized. Thus, it may be built into a fluid pump piston, and function as the primary pump valve; or it may be used at the foot of a water well pipe upwardly through which water is pumped, to prevent downward draining of the pipe when the pump stops working; or it may be built as a self contained general purpose unit, adapted to be connected in a fluid conduit line; etc. For purposes of a concrete disclosure and an illustrative embodiment herein, I have chosen to illustrate and describe a general purpose check valve construction.

Figure 1:
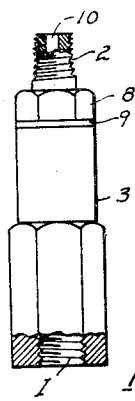
Fig. 1 is an elevational view with parts broken away for clearness of a check valve construction embodying my invention and illustrating it full scale for a suitable commercial size.

Fig. 1 illustrates such a "check valve" or check valve construction of one commercial size and form.

A conduit from a source of fluid pressure is to be screwed into the female pipe-threaded bore 1, and a conduit in which back pressure develops is to be connected to the male threaded nipple 2. Because of the small dimensions of some of the internal parts, their construction is reproduced to enlarged scale in Figs. 2 to 7.

A housing 3 which may conveniently be made from hexagonal brass bar stock to be engageable by a wrench (see Fig. 1), has a smooth bore 4 in its intermediate portion, the upper end of which is internally threaded at 5 to receive the threaded end 6 of a closure or head shown generally at 7, which also may conveniently be made from hex-bar stock (see Fig. 1), the head having a hexagonal flange 8 overlapping the end of the housing 3 and sealed thereon by a gasket 9 and having a conduit bore 10 therethrough and provided with the said threaded nipple 2. The bore 10 is enlarged at 11 to provide a receptacle for a valve spring 12, and a spring abutting shoulder 13.

The bore 4 in the housing 3 has a step or shoulder 14, and below it a conical valve seat or port 15, and a conduit bore 16 communicating with the said female threaded bore 1.

A valve 17 which, generally speaking, is of the poppet type, has an externally cylindrical body 18 reciprocable in the bore 4 and fits it with small clearance, to be guided by it. At its lower end the valve has a conical portion or valve-cone 19 of approximately the same cone angle as the valve seat or port 15 and fits the port to close it.

It is not intended that the valve cone 19 shall effect a fluid tight seal with the port 15 and both the valve cone and the port therefore can be cheaply made and finished.

Above the valve-cone 19 the valve has a neck 20 of reduced diameter, providing a shoulder 21, above which the neck continues into a conical stem 22, tapering toward the neck 20.

A generally annular fluid flow passageway 23 to be more fully referred to surrounds the conical stem 22 and communicates with a plurality of cross-passages 24—24 in the valve all of which communicate with a central passage 25 above them, preferably provided by a co-axial bore in the valve body 18.

The passageway 25 also constitutes a receptacle for the lower portion of the spring 12, the lower end of the spring abutting upon shoulders 26 which result from making the cross bores 24—24 of smaller diameter than the bore 25.

The spring 12 by thus reacting on the head 7 and upon the valve 17 will tend at all times to move the valve to close the port whether the construction is in the position for gravity to tend to close the port or not.

The upper end 27 of the valve body 18 is spaced from the lower end 28 of the head 7 to permit limited upward movement of the valve, and in instances in which the valve is opened suddenly its travel is stopped by engagement of the end 27 of the valve with the head at 28.

Figure 4:
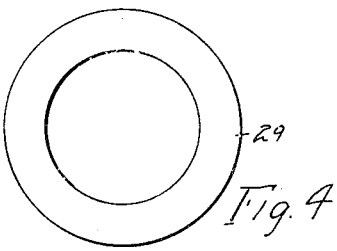
Fig. 4 is a plan view to still further enlarged scale of a sealing ring shown in cross section in Fig. 2.
Figure 5:
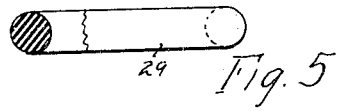
Fig. 5 is a side view of the ring of Fig. 4 with a part thereof broken away and part in section.

Surrounding the conical stem 22 of the valve is an annulus or ring 29 composed of material which is deformable or yieldable and elastic, and the material I prefer for this ring is rubber; and inasmuch as the valve may be employed to control the flow of oil I prefer to employ for the material of the ring artificial or synthetic rubber which is not attacked by oil or other derivatives from crude oil. Preferably also, for a purpose to be more fully developed, the ring is pre-formed to circular configuration as shown in Figs. 4 and 5 and also of circular cross section as shown in Fig. 5. Such rings have become commercial and are known as "O-rings," and a commercial ring of suitable dimensions for a check valve of the size of Fig. 1 would be of $\frac{1}{16}$ inch cross section and approximately $\frac{1}{8}$ inside diameter.

The external diameter of the neck 20 is preferably proportioned to the inside diameter of the ring, so that the internal diameter of the ring is smaller than the neck by a few thousandths of an inch, for example fifty thousandths to seventy-five thousandths, whereby the ring will be under some tension and elastically grip the neck 20.

Figure 2:
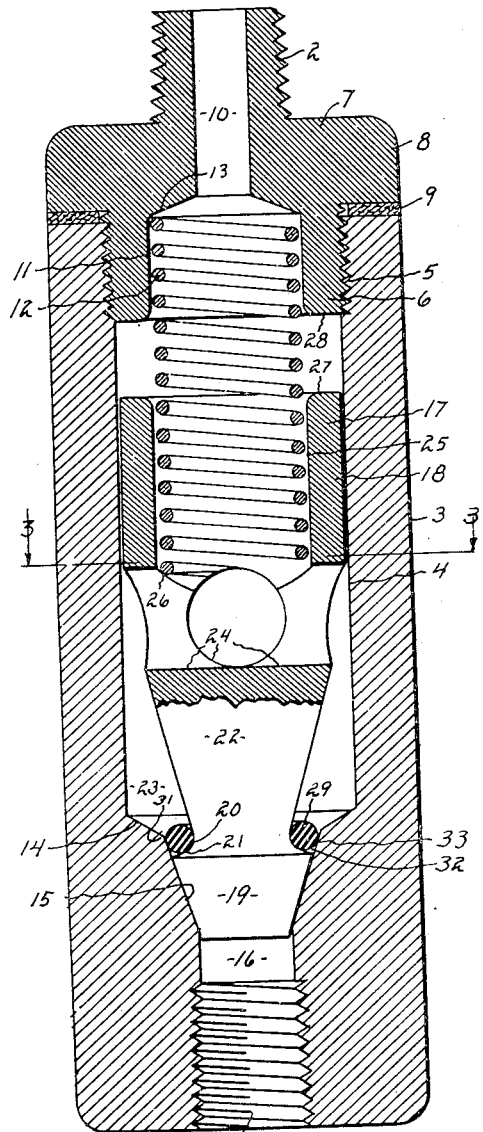
Fig. 2 is a longitudinal sectional view of the embodiment of Fig. 1 to a larger scale and showing a check valve thereof in normal position closing a valve port.

The conical form of the valve seat or port 15 continues upwardly (as viewed in the drawing) to a point 31 above and beyond the shoulder 21, so that in the closed position of the valve as illustrated in Fig. 2, the ring 29, resting upon the shoulder 21, and encircling the neck 20 is in an annular pocket 32 the outer wall 33 of which is a sealing surface.

The sealing surface 33 may as stated conveniently be provided by making it as a continuation of the conically tapering valve port or seat 15, but as will become apparent hereinafter, this is not strictly essential.

To assemble the parts above described, the ring 29 is stretched elastically and telescoped over the lower end of the valve cone 19 and snaps into position around the neck 20, which completes the assembly of the valve proper; and this assembly is dropped into the upper end of the housing 3; the spring 12 is then dropped into the spring receptacle 25 and the gasket 9 is telescoped over the threaded part 6 of the head 7 and then the threaded part 6 is screwed into the upper end of the housing 3, the upper end of the spring entering the enlarged bore 11, and when the head has been screwed to make a tight seal at the gasket, the spring 12, being of predetermined length, is put under some compression and holds the valve cone 19 upon the conical port or seat 15.

Figure 6:
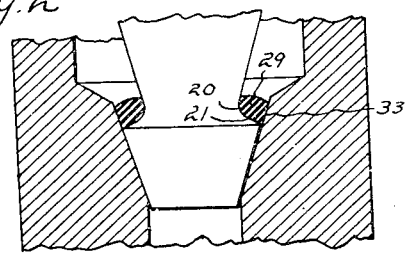
Fig. 6 is a fragmentary view of a part of Fig. 2 and showing a sealing ring thereof in the condition in which it is subjected to fluid back pressure to seal the valve.

With the valve and ring in the closed position of Fig. 2, whenever back pressure develops in the conduit bore 10, it is communicated through the enlarged bore 11, valve bore 25, cross bores 24—24 to the annular passageway 23, and since the valve port or seat 15 is closed but not sealed fluid tight, by the valve cone 19 therein, the upper side of the ring 29 is subjected to this back pressure and being of yieldable and deformable material, is deformed and fills the bottom of the pocket 32, and as shown in Fig. 6 is forced against the shoulder 21 and the sealing surface 33 and neck 20, completely sealing the port. The greater the effective back pressure the more tightly is the ring forced into the annular pocket and the more tight is the seal which it effects. From the foregoing it will be seen that the shoulder 21 is at an angle with the sealing wall 33, and that the back pressure forces or wedges the ring into this angle, and thereby makes the sealing action more effective.

The back pressure on the ring 29 besides sealing the port, produces a force on the valve in the closing direction.

Opening fluid pressure, communicated through the conduit portion 16 (through a conduit screwed into the threads 1 of the housing as referred to), subjects the lower end of the valve cone 19 to pressure, exerting force on the valve in the opening direction, and whenever this force becomes greater than the back pressure force in the closing direction added to the force of the spring 12, the valve 17 is bodily lifted; raising the valve cone 19 from the conical valve port or seat 15, and lifting the ring 29 out of the pocket 32 and breaking its seal. The valve may in some cases, depending upon the opening force, make a complete stroke upwardly, and be stopped upon the head at 28 as described; or, if the opening force be weaker, it may not complete this stroke; but in any case, when the valve starts to move, the parts take up the position illustrated in Fig. 7 and the fluid flows on the way to the cross passages 34 between the valve cone and the seat or port, and impinges upon the ring 29 in its position shown in dotted line, where it rests upon the shoulder 21, and surrounds the neck 20. The force exerted upon the ring 29 by this fluid flow removes it from the shoulder 21 and causes it to travel upwardly along the conical stem 22 of the valve to a higher position such for example as that shown for it at 29B.

Figure 7:
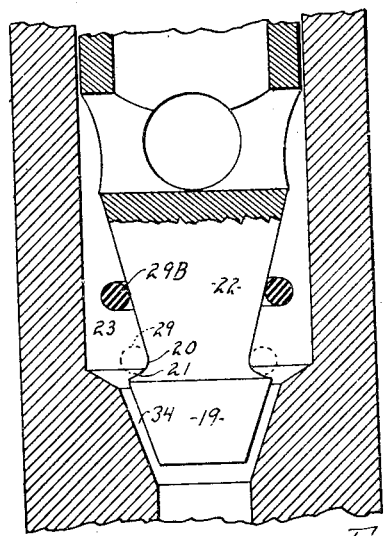
Fig. 7 is a view similar to Fig. 2 showing the valve in a position to which it is first moved by fluid opening pressure to open the valve port and showing the mode of operation of the sealing ring thereof.
Figure 3:
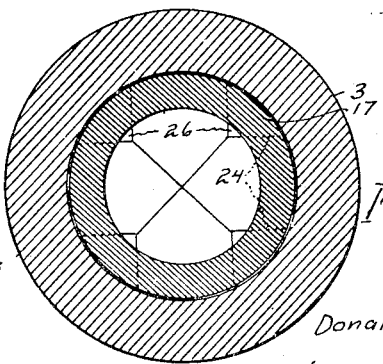
Fig. 3 is a cross sectional view taken from the plane 3—3 of Fig. 2.

As mentioned hereinbefore, the main bore 4 in the housing has a step or shoulder 14 at its lower end, inwardly of which are the sealing surface 33 and valve seat 15; and an annular passageway 23 is thus provided through which the fluid flows on the way to the cross passages 24—24; so that the ring 29 is in the direct path of this flow while on the shoulder 21 and is subjected to the force of this flow, but the force of the flow has moved the ring say to the position 29B of Fig. 7, the fluid has a free flow path around the outside of the ring, whereby the force of the flow on the ring dies out as the ring moves upwardly along the stem 22. Furthermore, as the ring moves upwardly on the conical stem it becomes more and more elastically stretched, as the diameter of the stem increases, so more force thereon is required to continue to move it upwardly. Thus as the ring moves upwardly from the neck 20 the force of the flow tending to move it decreases and the force required to move it increases so that a balance of these forces is reached and the ring comes to rest on the conical stem 22 at some position such as that indicated at 29B.

When the valve opening force is discontinued or dies out, the force of the spring 12 moves the valve downwardly again and closes the port 15 by the valve cone 19; and substantially stops the flow or reduces it to a very small value; and concurrently therewith, the elastic tension in the ring 29 acting on the tapering surface of the conical valve stem 22 which it constrictingly grips, causes the ring to move downwardly again toward the shoulder 21. As the ring thus moves downwardly toward portions of smaller diameter on the valve, the elastic tension in the ring decreases but it never entirely ceases because the ring will still have some elastic tension in it when it reaches the neck, since this was predetermined by the internal diameter of the ring as described above, so that the ring is always sure to return to the neck 20 and seat 21, where the back pressure causes it again to seal the port. The constricting elasticity of the ring and the conical surface prevent the ring from tipping and sticking on the stem by maintaining it always in planes at right angles to the axis of the valve.

The cone angle of the valve cone 19 as is well known in prior practice where cone shaped valves and valve seats have been used, is not critical, and I have found that this angle can conveniently be made, and will operate satisfactorily, if it is approximately 60°. The fit of the valve cone and its seat needs to be only good enough and preferably is made only good enough to reduce the flow to a very small rate or "leak."

The optimum cone angle of the conical stem 22 however will depend upon the kind of material used in the stem and the smoothness to which its surface is finished, and the material of the ring itself, and the kind of fluid flowing through the valve.

The ring 29 must freely return to its normal position (for example from the position 29B to that in dotted line in Fig. 7 as described). Obviously, if the surface of this conical stem is polished and the fluid flowing through the valve is oil, the cone angle of the stem may be a smaller angle than if the surface were rough or the fluid were air containing particles which render the surface slightly tacky, or if it were gasolene which would cut off all traces of oil.

Again, I have found that if the surface of the conical stem 22 is not conducive to sliding of the ring and if the cone angle of the conical stem be relatively large, the ring instead of sliding down, may roll down.

I have also found, that for a given cone angle of the conical stem 22, the free return of the ring by sliding will be affected by the material of the ring itself or by its hardness or deformability under compression. For example, considering a ring the inside diameter of which measures $\frac{3}{16}$ inches and which is approximately one-sixteenth inch in cross sectional diameter, and of artificial oil-resisting rubber, if it has a hardness of 70 standard durometer, it will freely return by sliding down the conical stem for cone angles of 20° or higher but may not always slide at a cone angle of 10°; whereas the same size of ring having a hardness of 90 standard durometer will slide down freely for cone angles of 30° or 40° and higher but may not always slide freely at cone angles of 20° or less.

For these reasons, and to have a large tolerance, and for general practical uses, I prefer to make the cone angle of the conical stem 22 approximately 40°, for a commercial, O-ring of artificial rubber, having a hardness of 70 to 90 durometer, although as well be apparent from the foregoing, these factors may be considerably varied without sacrificing reliable operation.

It will be apparent also that if the check value is used in a system in which the fluid is water or air, rings made from ordinary or natural rubber will be satisfactory, and as mentioned my invention is not limited to features of construction which cause the ring to slide because it will operate satisfactorily if the conditions are such that it is caused to roll.

I have found that the seal of the valve above described is self-cleaning. Any material or particles in the fluid which tend to adhere to the sealing surfaces at the port will be washed off and carried upwardly out of the valve by the rush of fluid when the valve first opens; and similarly any particles which tend to adhere to the sealing ring will be likewise washed off of it.

Figure 8:
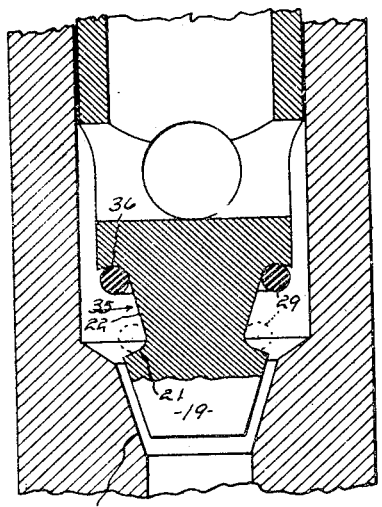
Fig. 8 is a fragmentary view similar to a part of Fig. 7 but illustrating a modification of the check valve thereof and the mode of operation of the sealing ring therewith.

In some types of installation, the check valve will be opened by a sudden impulse of opening pressure at a very high value attained in a very short time and in such cases the force exerted by the flow of fluid against the ring and which carries it upwardly along the conical stem 22 may be so great and move it so far upwardly therealong so as to obstruct or cut off the flow at the entrances to the cross passages 24—24 or actually force it into one or another of these passages; and in such cases I provide means for positively stopping upward movement of the ring, such means being shown in Fig. 8. In this form, a groove 35 is cut in the side of the valve which besides providing the shoulder 21 and a conical stem 22 of preselected cone angle, provides also a second shoulder 36, axially spaced from the first shoulder. This groove and the two shoulders may be cut simultaneously by a single lathe tool. The ring when moved upwardly impinges against the shoulder 36 and is held against it by the flow of fluid in the passage 23 around it operating as was described in connection with the first form.

Figure 9:
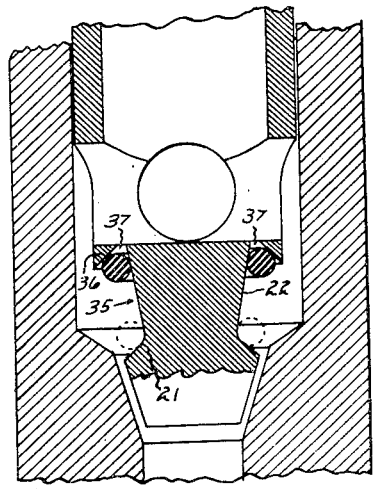
Fig. 9 is a fragmentary view similar to Fig. 8 showing a further modification.

In Fig. 9 is illustrated a modification of the form of Fig. 8.

Here when the lathe tool cuts the said groove 35 to form the shoulders 36 and 21 and the conical stem 22, the tool cuts into the cross passages 24—24, providing passages 37 one corresponding to each cross passage, and opening into the groove 35. In this form, when the opening fluid pressure is cut off or dies out, the back pressure acts through the passages 37 and gives a starting impulse to the ring to start it from the shoulder 36 on its return down the conical stem to the shoulder 21.

In all of the above described embodiments of my invention, the sealing ring will always return to its sealing position on the conical stem, by the action of its constricting elasticity, even if the valve in closing settles down gently on the valve seat. If the valve construction is used in circumstances in which the valve returns rapidly to its seat (as it would if the back pressure were high and the opening pressure were abruptly cut off), the valve cone 19 will strike a blow on the seat or port 15 and come abruptly to rest. In such a case the ring will be moved to its sealing position by its inertia, in addition to being moved by its elasticity acting on the conical surface 22.

Figure 10:
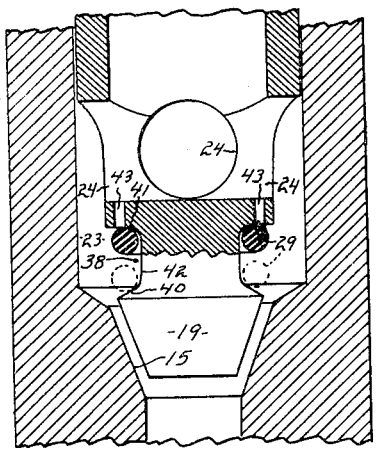
Fig. 10 is a view similar to Figs. 8 or 9 showing another modification.

Therefore, although the preferred means for returning the sealing ring to its sealing position is the conical form of the valve stem and the utilization of an elastic ring as described, in installations in which it is known that the valve cone will always seat with a blow, another means to insure return of the ring may be employed, and this modification is illustrated in Fig. 10.

A groove 38 cut in the valve stem 39 has shoulders or side walls 40 and 41 similar to the shoulders 21 and 36 of Fig. 8, but the bottom wall of the groove instead of being conical is cylindrical, and defines a cylindrical stem or stem portion 42. The inside diameter of the ring is preferably slightly larger than or equal to the diameter of the stem 42 and floats freely thereon. When the valve cone 19 first opens the port 15, the ring 29 is moved by the fluid flow, from the dotted to the solid line position, against the shoulder 41, where it is held by the fluid flow around it in the passage 23. Ports 43—43 are drilled from the groove 38 into the cross passages 24. The drop of pressure through these ports also contributes to holding the ring against the shoulder 41. When the valve starts to close and back pressure becomes effective, the flow downwardly through the ports 43—43 impinging on the ring starts the ring toward the shoulder 40 and this together with the sudden stopping of the valve cone on the seat and the resulting blow and the action of inertia of the ring as referred to above, causes the ring to move to the shoulder 40 where the back pressure will again seal the port by deforming the ring.

The ring in this case is made of deformable or compressible material; and may be elastic; although in this case its elasticity is not important and it may be of inelastic material.

In the foregoing embodiments of my invention, a step or shoulder 14 is provided between the valve seat 15 and the wall of the bore 4 (See Fig. 2) to provide an enlarged fluid passageway through which the fluid may freely flow around the outside of the ring in the open condition of the valve for the purposes described; and it will be apparent that this shoulder 14 may be at any suitable angle to the axis of the valve structure. By providing such a shoulder, the upward stroke of the valve and the upward movement of the ring to develop the said passageway around the ring (for the described purposes) can be kept to the minimum. However, such a shoulder is not essential and a modification in which it is omitted is shown in Figs. 11 and 12.

In this form, the conical valve seat 15 is continued as at 44 (without a shoulder) out to the wall of the bore 4.

Figure 11:
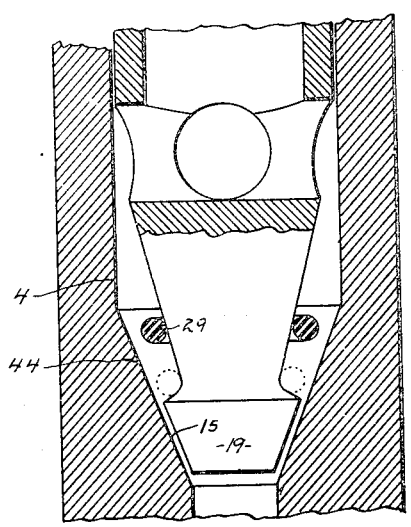
Figs. 11 and 12 are views showing in two forms, a further modification which may be utilized in the forms of Figs. 1 to 10 inclusive.
Figure 12:
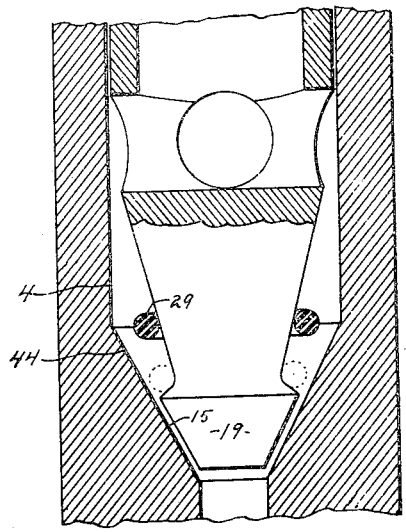

With this modification, it will be apparent that if the cone angle of the conical surface 44—15 is made relatively acute, as shown in Fig. 11, the valve will move upwardly relatively far before a free flow passageway around the ring 29 has developed (for the described purposes), and that this upward movement will be less, and relatively small, if this cone angle is made more obtuse as shown in Fig. 12. A wide choice for this cone angle is therefore available, and will be determined by the desired cone angle for the valve-cone 19 and the desired movement of the valve. In any case the maximum movement of the valve can be determined by determining the distance between the surfaces 27 and 28 of Fig. 2 omitted here for simplification.

It will be apparent that this modification may be applied to either of the forms of Figs. 2, 8, 9, or 10.

In the forms heretofore described, in which a shoulder 14 is provided, a single conical surface or bore may, if desired, provide both the valve seat 15 and the ring sealing surface 33; but when this modification of Figs. 11 and 12 is utilized, the single conical surface or bore 44—15 not only provides the valve seat 15 and the ring sealing surface 33 but also eliminates the shoulder (as these parts are identified in Fig. 2).

It will be observed that in all of the forms above described, when the ring is in the sealing position and subjected to back pressure as indicated in Fig. 6, it is in an annular pocket surrounded by metal walls on all sides except the upper side upon which the back pressure is applied; and that when the valve opens, the ring is lifted out of the pocket, and is not then nor thereafter subject to any considerable compressive or extrusive forces between metal parts. This is one of the particular advantages of this invention. This advantage is not obviously apparent, and can best be understood by a comparison with prior structures utilizing rings of this general class for effecting a seal of a valve port; and in all such prior constructions of which I have knowledge, when the valve opens or starts to open, the flow of the fluid under opening pressure and impinging upon the sealing ring forces it into a crevice or a constricted passage or otherwise forcibly deforms it or extrudes it or in some cases tears it out of its mounting resulting in rapid deterioration of the sealing surfaces of the ring, and in some cases completely destroys its sealing function. In this connection, it should be noted that check valves of this class are sometimes subjected to very abrupt opening pressure of fifteen hundred pounds to the square inch or more.

This application is a continuation in part of my pending application, Serial Number 553,683, filed September 12, 1944, for Check valves.

My invention is not limited to the exact details of construction illustrated and described herein. Changes and modifications may be made therein, and my invention comprehends all such changes and modifications which come within the scope of the appended claims.

I claim:

1. In a check valve construction of the type having a valve port in a housing, a valve seat for the port, and a valve held on the seat to close the port by fluid back pressure and removable from the seat to open the port by fluid opening pressure; an annular sealing surface surrounding the valve port on the back pressure side of the valve seat; the valve having a stem portion on the back pressure side of the valve tapering toward the valve, and a shoulder on the stem portion; the stem portion, shoulder and sealing surface disposed to provide a three-walled annular pocket generally of U-shape in cross section and open in the direction of valve opening movement when the valve is closed; a sealing ring of yieldable elastic material of circular cross section in the pocket and surrounding the stem portion and deformable by back pressure into sealing engagement with the walls of the U-shaped annular pocket, to seal the port; the ring being movable expandingly along the stem portion and away from the shoulder and out of the pocket in the direction of valve opening movement by the force of fluid flow impinging thereon when the valve is raised from the port by opening fluid pressure; and a flow passageway of larger diameter than the ring through which the fluid flows around the outside of the ring in its moved position and holds the ring in moved position; and the angle of taper of the stem portion predetermined to cause the elasticity of the expanded ring to return the ring along the stem portion toward the shoulder, upon return of the valve to the seat.

2. A check valve construction comprising a housing; a valve port in the housing provided with a valve seat; a valve reciprocable in the housing to close and open the port by engaging the disengaging and seat; the valve being arranged to be held on the seat by fluid back pressure on one side, and to be raised from the seat by opening fluid pressure on the other side; the valve having a tapered stem portion on its back pressure side tapering toward the port and provided with a shoulder; an annular sealing surface surrounding the port at the back pressure side thereof and extending in the general direction of the stem portion; a seal for the closed port comprising a ring of elastic rubber or the like constrictingly surrounding the valve tapered stem portion and having a sealing position thereon in which it is compressed in sealing engagement upon the stem, shoulder, and sealing surface, by fluid back-pressure; the ring being movable on the valve tapered portion away from the port and out of said sealing engagement, by fluid flow impinging thereon upon opening of the valve port; the housing having an enlarged fluid passage for fluid flow outwardly around the outside of the ring after it has moved on the tapered valve portion away from the port whereby further movement of the ring by fluid flow is discontinued; the taper angle of the tapered valve portion being preselected to cause the ring to return to its sealing position on the valve element by the action of its inherent elasticity upon reduction of fluid flow through the port.

3. A poppet-type check-valve construction comprising a conical valve, formed to cooperate with a conical valve seat, and a conical stem portion tapering toward the valve; the diameter of the tapering stem at its juncture with the valve being less than the diameter of the valve, providing a shoulder; a ring of rubber or like elastic compressible material surrounding and mounted on the tapering portion, and normally engaging the shoulder; the tapering stem portion being of elongated axial extent greater than the cross sectional diameter of the ring; and the ring being movable therealong away from the shoulder; the taper angle of the stem portion and the internal diameter and elasticity of the ring being predetermined to cause the ring, by the action of its inherent elasticity, to return to the shoulder after being displaced therefrom along the tapering portion by flow through the cooperating valve seat.

4. A poppet-type check-valve construction comprising a conical valve, formed to cooperate with a conical valve seat, and a conical stem portion tapering toward the valve; the diameter of the tapering stem at its juncture with the valve being less than the diameter of the valve, providing a shoulder; a ring of rubber or like elastic compressible material surrounding and mounted on the tapering portion, and normally engaging the shoulder; the tapering stem portion being of elongated axial extent greater than the cross section diameter of the ring; and the ring being movable therealong away from the shoulder; the taper angle of the stem portion and the internal diameter and elasticity of the ring being predetermined to cause the ring, by the action of its inherent elasticity, to return to the shoulder after being displaced therefrom along the tapering portion by flow through the cooperating valve seat; and a second shoulder on the tapered portion spaced from the first shoulder to determine a displaced position for the ring.

5. A check valve construction comprising a housing; a valve port in the housing provided with a valve seat; a valve reciprocable in the housing to close and open the port by engaging and disengaging the seat; the valve being arranged to be held on the seat by fluid back pressure on one side, and to be raised from the seat by opening fluid pressure on the other side; the valve having a tapered stem portion on its back pressure side tapering toward the port and provided with a shoulder; an annular sealing surface surrounding the port at the back pressure side thereof and extending in the general direction of the stem portion; a seal for the closed port comprising a ring of elastic rubber or the like constrictingly surrounding the valve tapered stem portion and having a sealing position thereon in which it is compressed in sealing engagement with the stem, shoulder and sealing surface, by fluid back-pressure; the ring being movable on the valve tapered portion away from the port and out of said sealing engagement, by the force of fluid flow impinging thereon upon opening of the valve port; the housing having an enlarged fluid passage for fluid flow outwardly around the outside of the ring after it has moved on the tapered valve portion away from the port whereby the force of fluid flow on the ring is reduced; and stop means to stop fluid-flow-effected movement of the ring on the tapered valve portion after a predetermined extent of movement thereof.

DONALD C. GREEN.

REFERENCES CITED

The following references are of record in the file of this patent:

UNITED STATES PATENTS

| Number | Name | Date |
|---|---|---|
| 80,066 | Gibson | July 21, 1868 |
| 157,800 | Demarest | Dec. 15, 1914 |
| 481,761 | Hughes | Aug. 30, 1892 |
| 819,437 | Jones | May 1, 1906 |
| 839,854 | Jones | Jan. 1, 1907 |
| 1,687,745 | Wilson | Oct. 16, 1928 |
| 2,002,672 | Melott | May 28, 1935 |
| 2,063,047 | Noble | Dec. 8, 1936 |

FOREIGN PATENTS

| Number | Country | Date |
|---|---|---|
| 147,053 | Austria | Sept. 25, 1936 |
| 290,373 | Great Britain | May 15, 1928 |
| 701,965 | France | Jan. 19, 1931 |